US008684552B2

(12) United States Patent
de Blois

(10) Patent No.: US 8,684,552 B2
(45) Date of Patent: Apr. 1, 2014

(54) LIGHTED FURNITURE ASSEMBLY

(75) Inventor: Martin de Blois, Gallatin, TN (US)

(73) Assignee: Agio International Company, Ltd, Hong Kong (HK)

( * ) Notice: Subject to any disclaimer, the term of this patent is extended or adjusted under 35 U.S.C. 154(b) by 135 days.

(21) Appl. No.: 13/546,360

(22) Filed: Jul. 11, 2012

(65) Prior Publication Data

US 2014/0016306 A1  Jan. 16, 2014

(51) Int. Cl.
*F21V 3/02* (2006.01)
*A47B 96/18* (2006.01)
*E03C 1/33* (2006.01)

(52) U.S. Cl.
USPC ...... 362/133; 362/101; 362/134; 362/311.13; 362/311.14; 4/631; 4/638; 312/140.1

(58) Field of Classification Search
USPC ............ 362/133, 134, 145, 152, 234, 311.14, 362/96, 101, 311.13; 4/631–636, 638, 660; 312/140.1, 140.4, 210, 228
See application file for complete search history.

(56) References Cited

U.S. PATENT DOCUMENTS

| | | |
|---|---|---|
| 1,335,640 A | 3/1920 | Beales |
| 1,791,674 A | 2/1931 | King |
| 2,829,245 A | 4/1958 | Levings |
| 3,603,784 A | 9/1971 | Wellhofer |
| 3,689,762 A | 9/1972 | Shatan |
| 4,165,529 A | 8/1979 | Hagelthorn |
| 4,233,656 A | 11/1980 | Shemitz |
| 4,712,166 A | 12/1987 | Stewart |
| 4,731,717 A | 3/1988 | Yu et al. |
| 4,972,308 A | 11/1990 | Chen |
| 5,404,264 A | 4/1995 | Park |
| 7,401,951 B2 | 7/2008 | Lee |

FOREIGN PATENT DOCUMENTS

CH  610639 A  4/1979

*Primary Examiner* — Joseph L Williams
(74) *Attorney, Agent, or Firm* — Williams Mullen

(57) ABSTRACT

A lighted furniture apparatus and kit having a base, a plurality of side panels, a top, and a lighting element. At least a portion of the side panels are at least partially light transmitting. The side panels include vertical edges, each defining a partially-enclosed rod-receiving passage. An elongated connecting rod is configured to be slidably received within the rod-receiving passages of two adjacent panels to secure them together. The lighting element may be disposed within the interior space formed by the base, side panels, and top.

21 Claims, 9 Drawing Sheets

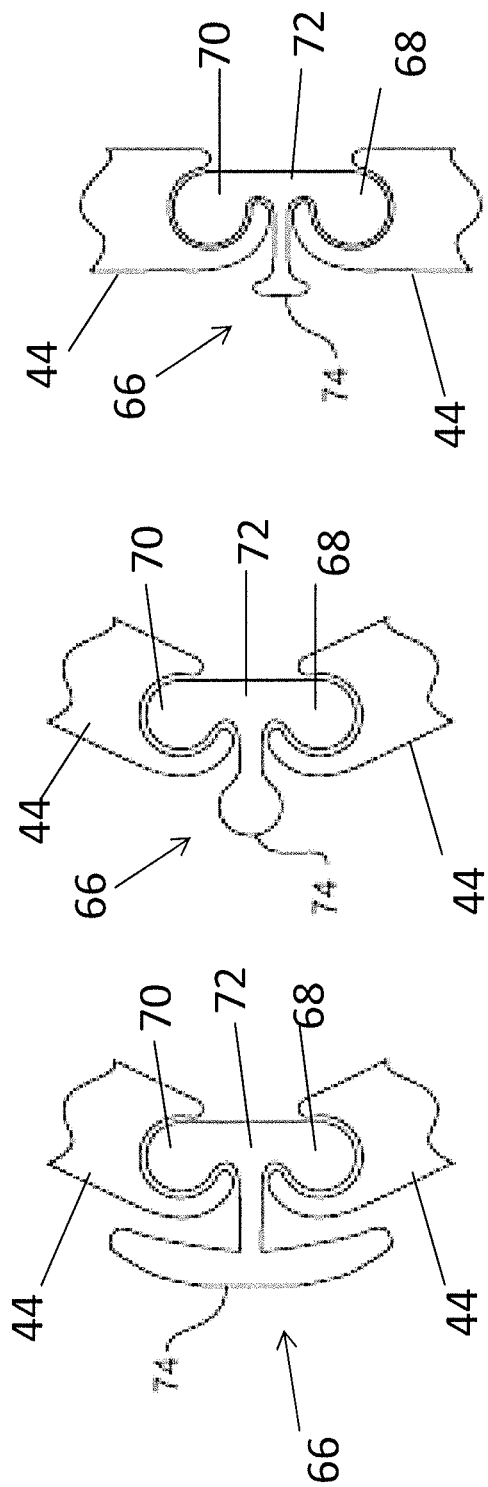
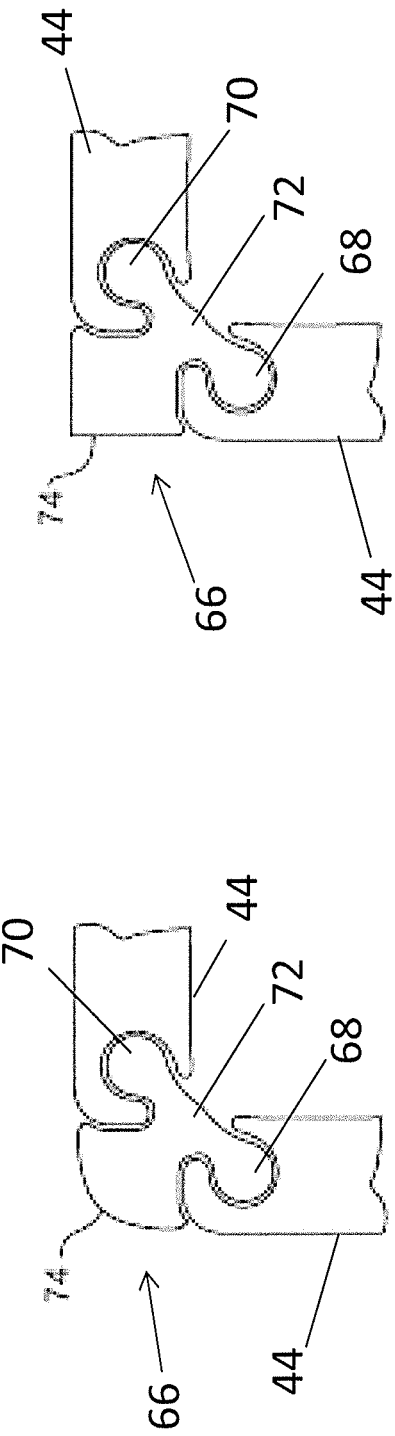

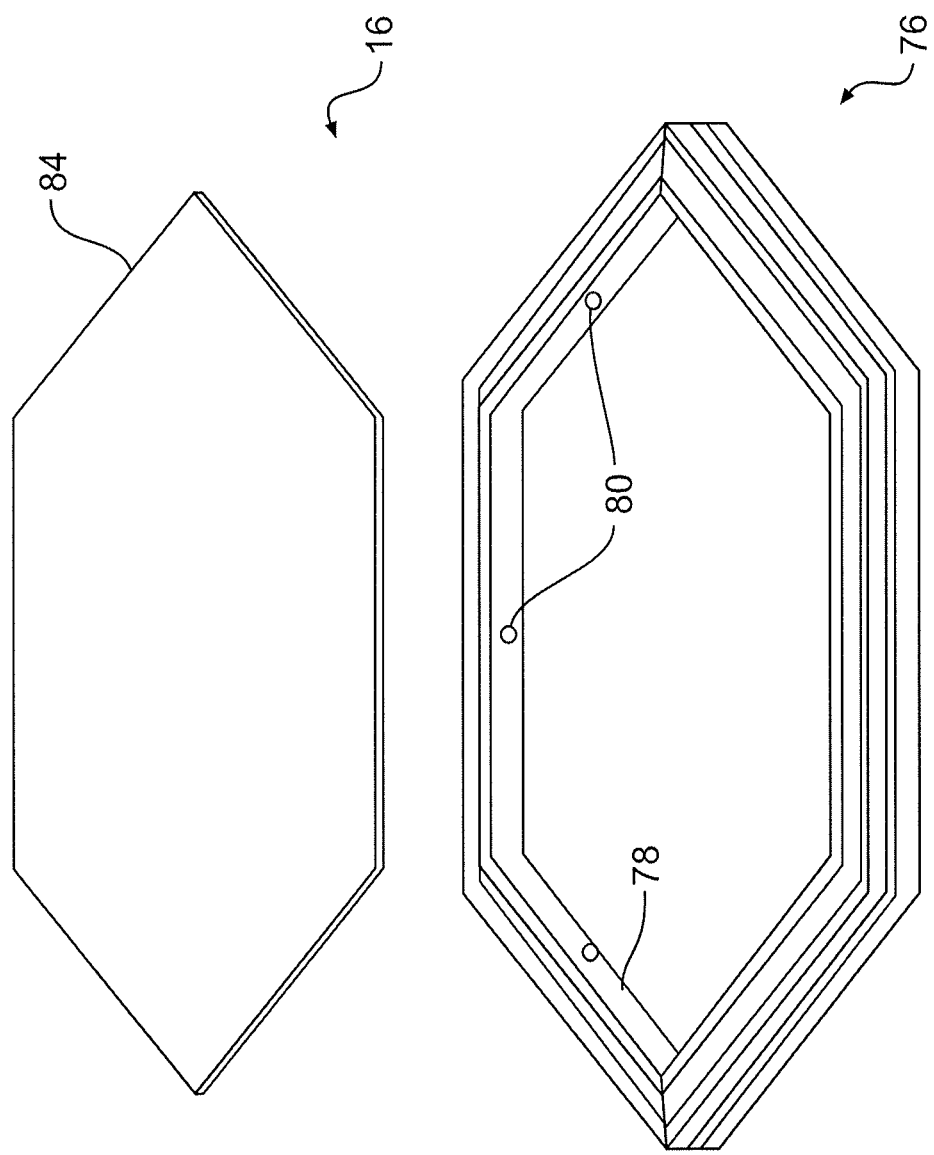

US 8,684,552 B2

LIGHTED FURNITURE ASSEMBLY

FIELD OF THE INVENTION

The present invention relates in general to furniture and lighting. More particularly, the present invention pertains to an illuminated furniture apparatus and system that can be shipped disassembled, to be assembled by the retailer or end consumer.

BACKGROUND

Generally, illuminated furniture systems and decorative lanterns, such as those suitable for use in a home, are small sized and fully and permanently assembled. For example, decorative lanterns using glass panes are typically framed inside a fully welded metal enclosure.

One problem with fully-assembled furniture systems and lanterns is that larger items can become prohibitively expensive to ship over long distances. For example, while it would be desirable to manufacture an illuminated furniture system or lantern large enough to serve as both a lighting fixture and an end table, such a product would be very expensive to ship long distances (e.g., from overseas to the US) if it were fully assembled due to its relatively large shipping volume. Great savings in shipping costs could be achieved if the item could be shipped disassembled, and assembled by the retailer or end consumer.

There exists a need for an illuminated furniture system that can be shipped unassembled and put together easily by the retailer or end consumer.

SUMMARY OF THE PRESENT INVENTION

An illuminated furniture apparatus comprises a base, a side panel assembly, a top, and a lighting element. The side panel assembly includes at least a first and second side panel. At least a portion of each of the side panels is at least partially light-transmitting. The first side panel has a first vertical edge, and the second side panel has a second vertical edge. Each of the first and second vertical edges defines a partially-enclosed rod-receiving passage that runs longitudinally along and within the vertical edge and a longitudinal opening that runs along the vertical edge and opens into the rod-receiving passage. The side panel assembly includes at least one elongated connecting rod having a substantially consistent cross-sectional shape. The connecting rod includes a first enlarged cross-sectional portion with a first thickness, a second enlarged cross-sectional portion with a second thickness, and a cross-sectional bridge portion disposed between and connecting said first and second enlarged portions. The bridge portion has a third thickness that is less than the first and second thicknesses. The connecting rod is configured to connect the first and second side panels when the panels are positioned with the first panel adjacent to the second panel so that the first and second vertical edges are adjacent with the longitudinal openings of the rod-receiving passages facing. The first enlarged portion of the connecting rod is sized and shaped to be slidably received within, and at least partially retained by, the rod-receiving passage of the first vertical edge. The second enlarged portion of the connecting rod is sized and shaped to be slidably received within, and at least partially retained by, the rod-receiving passage of the second vertical edge. The longitudinal openings of the first vertical edge and the second vertical edge are sized and shaped to permit the bridge portion to pass therethrough longitudinally. The furniture system thereby defines an interior space with sides at least partially enclosed by the side panel assembly. An upper portion of the side panel assembly is operably configured to receive the top, and the base is operably configured to receive a bottom portion of the side panel assembly. The lighting element is disposed within the interior space. The lighting furniture apparatus may be provided in kit form for assembly by a third party, such as a retailer or end consumer.

In certain embodiments, the first and second side panels include a frame and an insert pane that is at least partially enclosed by the frame. The insert pane is at least partially light-transmitting. The frame of the first side panel includes a first frame side piece. The frame of the second side panel includes a second frame side piece. The first frame side piece includes the first vertical edge and the second frame side piece includes the second vertical edge. Each of the first and second frame side pieces may further define an insert pane-receiving channel that runs longitudinally along the side pieces on a side of the side pieces substantially opposing the rod-receiving passage, the insert-pane receiving channel being configured to receive a side edge of the insert pane. The first frame side piece may define a first end access at an end of the first frame side piece, and the second frame side piece defines a second end access at an end of the second frame side piece. The first end access communicates into the rod-receiving passage of the first frame side piece, and the second end access communicates into the rod-receiving passage of the second frame side piece. The first and second end accesses are configured to slidably receive, respectively, the first and second enlarged portions of the at least one connecting rod.

In certain embodiments, the furniture apparatus includes a plurality of connecting rods and a plurality of side panels, each of the plurality of connecting rods being configured to be inserted in the longitudinal channels of the frames, thereby connecting adjacent two of the plurality of side panels. The base and the top may each define a polygonally-shaped perimeter in cross-section taken in a plane parallel to a surface on which the base is configured to rest. The connecting rod may be made from an extruded material, such as plastic. The connecting rod may further include a decorative cross-sectional portion that extends outwardly from the bridge portion beyond the first and second side pieces along a longitudinal length. The decorative portion may have a flange presenting an outwardly facing surface and be configured to at least partially conceal a joint formed by the connecting of the adjacent first and second panels. The rod-receiving passage may have a generally circular-shaped cross section. The first and second enlarged portions may have a generally circular-shaped cross section.

The lighting element may be secured to a portion of the base system. The lighting element may be battery-powered. The lighting element may include a battery-powered LED light. The furniture apparatus may also include a slidable tray secured to the base system. The slidable tray may include a recess. A battery assembly may be disposed in the recess. The slidable tray may be configured to be slid out from underneath the base system to permit easy access to the battery assembly.

The top system may include a top frame and a top insert pane. The top insert pane may be at least partially light-transmitting. The base system and the frames of the first and second side panels may be metal. The insert panes may be glass or plastic.

The frame portion of the first side panel may include a first lower tab defining a first hole, and the second side panel may include a second lower tab defining a second hole. The base system may define third and fourth holes. The first and third holes may be aligned in overlapping fashion during assembly such that the first and third holes are adapted to receive a first fastener to secure the first panel to the base system. The second and fourth holes may be aligned in overlapping fashion during assembly such that the second and fourth holes are adapted to receive a second fastener to secure the second panel to the base system.

BRIEF DESCRIPTION OF THE DRAWINGS

FIGS. 9A-9E are cross-sectional views of a variety of different connecting rods having differently-shaped decorative portions according to an embodiment of the present invention.

FIG. 10 is a perspective view of a top showing the top frame and top insert according to an embodiment of the present invention.

DETAILED DESCRIPTION OF THE PREFERRED EMBODIMENTS

Figure 1:
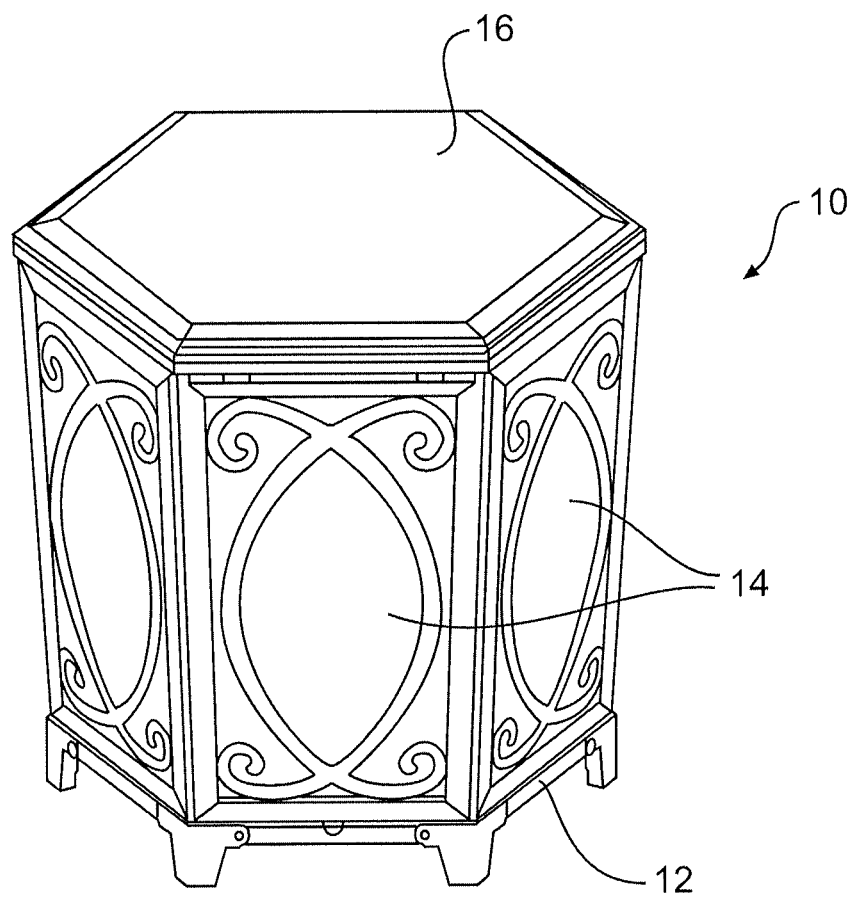
FIG. 1 is a perspective view of an illuminated furniture system [?] according to an embodiment of the present invention.

A lighted side table 10 as shown in FIG. 1 includes a base 12, a plurality of side panels 14, and a top 16.

Figure 2:
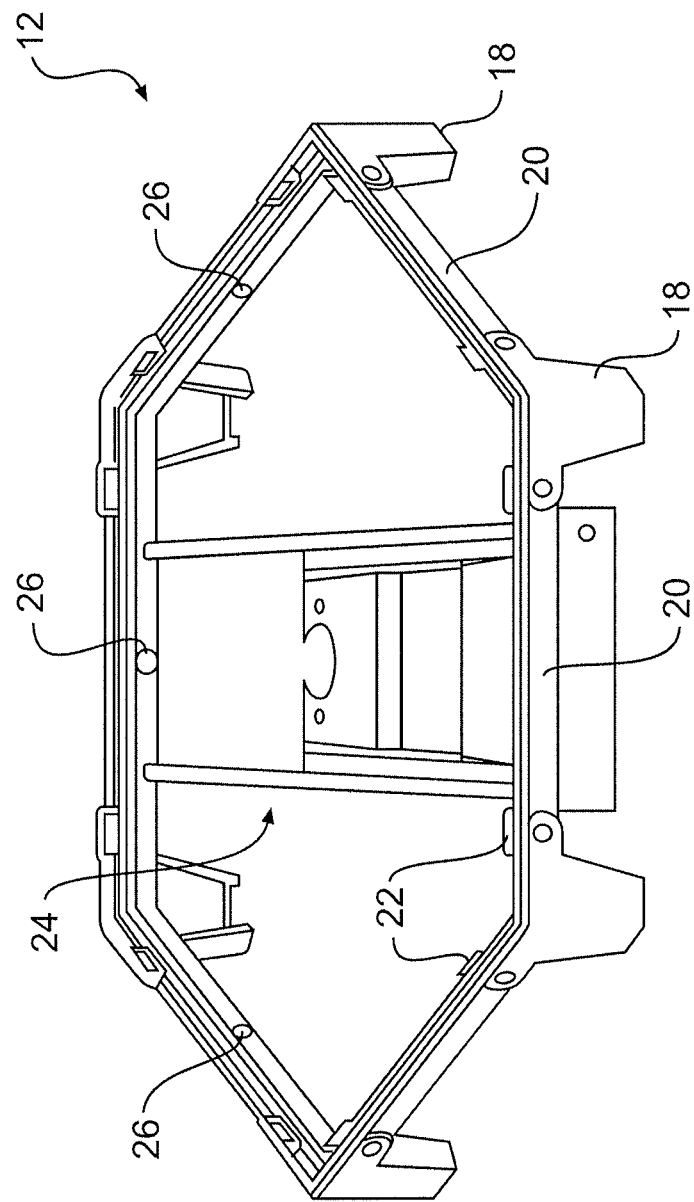
FIG. 2 is a perspective view of a base according to an embodiment of the present invention.

An exemplary base 12 is shown in FIG. 2. Base 12 is preferably formed from a relatively rigid material such as aluminum, brass, copper, other metal or rigid plastic, but other suitable materials can also be used. The base 12 as illustrated defines a hexagonal perimeter in a cross section taken in a plane parallel to a surface on which the base rests, however, base 12 can be any suitable shape. For example, in other embodiments, base 12 can be circular, elliptical, square, rectangular, or have an irregular shape. Base 12 includes a plurality of legs 18 and a support structure comprising a plurality of sides 20. Base 12 can be made from separate pieces that are manufactured separately and then assembled together. Alternatively, base 12 can be integrally formed. If the base requires assembly, that assembly can be done either by the manufacturer prior to shipment, by the retailer, by the end consumer, or by some combination of the foregoing. Screws, bolts, welding, or other suitable fastening means can be used to fixedly secure portions of the base, such as the individual sides 20 together. Each side 20 of the support structure is configured to receive a side panel 14. In certain embodiments, the sides 20 of the support structure can include channels sized and shaped to receive the side panels. Other suitable structures and mechanisms such as guide tabs 22 may be used to facilitate mating of the side panels 14 to the base 12. Pre-drilled holes 26 in sides 20 are configured to receive a bolt or screw for securing a respective side panel 14 to the base 12, although those holes can also be provided through other means, such as tabs affixed to the sides in an appropriate location.

Figure 3:
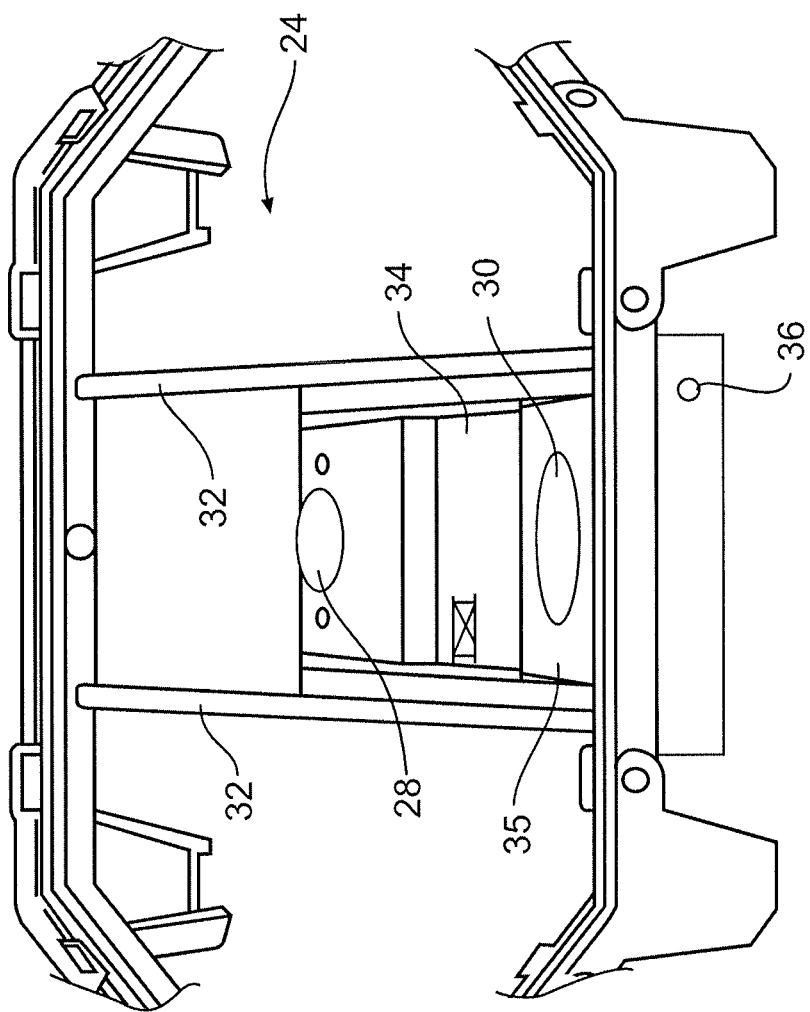
FIG. 3 is a top perspective view of a lighting assembly, as incorporated into a base, according to an embodiment of the present invention.

In the preferred embodiment, base 12 includes a lighting assembly 24, an example of which is shown in FIG. 3. Any suitable lighting element or elements can be used with the table. For example, the lighting element can be one or more incandescent, compact fluorescent (CFL), metal halide, halogen, LED, or other light bulbs. In the illustrated embodiment, lighting assembly 24 includes an LED light assembly 28. LED light assembly 28 is mounted on tray 34. Tray 34 is slidably connected to support rails 32. Tray 34 includes a recess 35 for containing battery assembly 30. Battery assembly 30 can use any suitable battery or power source. For example, battery assembly 30 can be configured to receive a suitable number of conventional AA alkaline batteries. Because the lighting assembly is located underneath or within the enclosure of the lighted side table 10, the illustrated slidable tray configuration facilitates changing of the batteries by allowing easy access to battery assembly 30. A power button or on/off switch 36 can be disposed on the front face of tray 34. While the illustrated embodiment has been described with reference to a battery-powered light assembly, in other embodiments a plug-in electronics assembly can be used. In such embodiment, a cord and plug assembly can be configured to exit from beneath base 12.

Figure 4A:
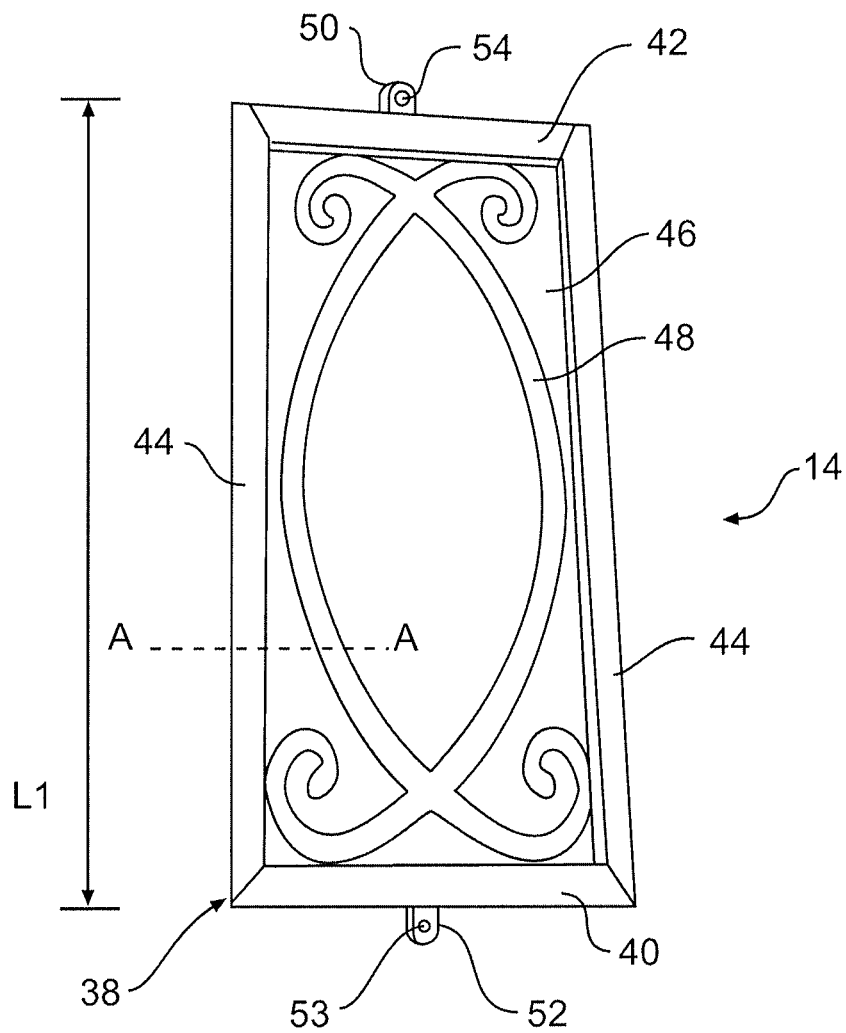
FIG. 4A is a front view of a panel according to an embodiment of the present invention.
Figure 4B:
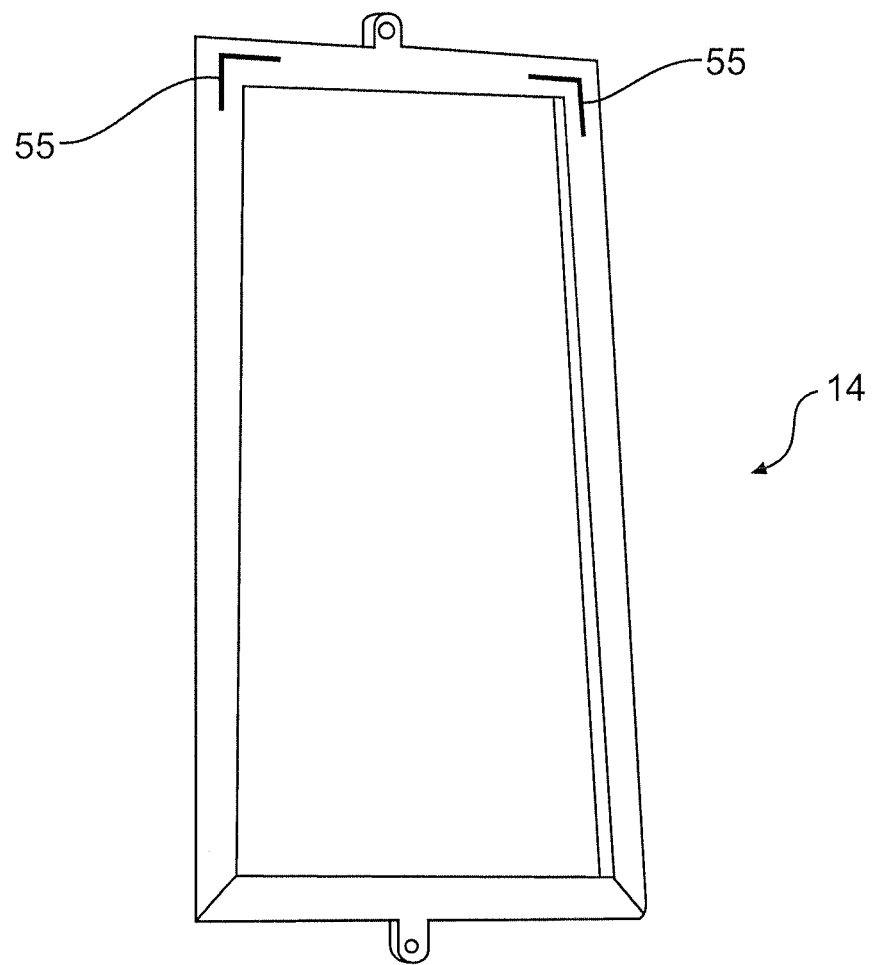
FIG. 4B is a rear view of the panel of FIG. 4A.

FIGS. 4a and 4b show respectively a front and rear view of panel 14. Panel 14 includes a frame 38 and an insert 46. In other embodiments, the panels of the furniture system may not include a separate frame and insert, but may instead be integrally formed. Insert 46 is preferably transparent, partly-transparent, translucent, and/or partly translucent so as to allow at least some light to pass from the light assembly 24 within the table 10. Insert 46 can be formed from glass, plastics, or other materials having suitable light-transmitting properties. Insert 46 can also include one or more opaque portions, such as design element 48 which can be incorporated into the insert 46 itself, through processes such as frosting, or made of a separate material, such as steel, aluminum, copper or other metal, and secured to insert 46 with an adhesive, or affixed to the frame 38 through such processes as welding. Frame 38 surrounds and retains the insert 46 on one or more sides. Frame includes frame side pieces 44, frame top piece 42, and frame bottom piece 40. Frame 38 is preferably formed from a relatively rigid material such as aluminum, brass, copper, other sheet metal, or rigid plastic. As illustrated, frame side pieces 44, frame top piece 42, and frame bottom piece 40 include mitered ends and fit together in a manner similar to a traditional picture frame. L-shaped brackets 55 can be used to secure frame side pieces 44 to frame top piece 42 and/or frame bottom piece 40. Frame portions can also be connected to one another by welding or other suitable means. Frame bottom piece 40 includes a tab 52 defining a hole 53 formed therein. Similarly, frame top piece 42 includes a tab 50 defining a hole 54.

Figure 5:
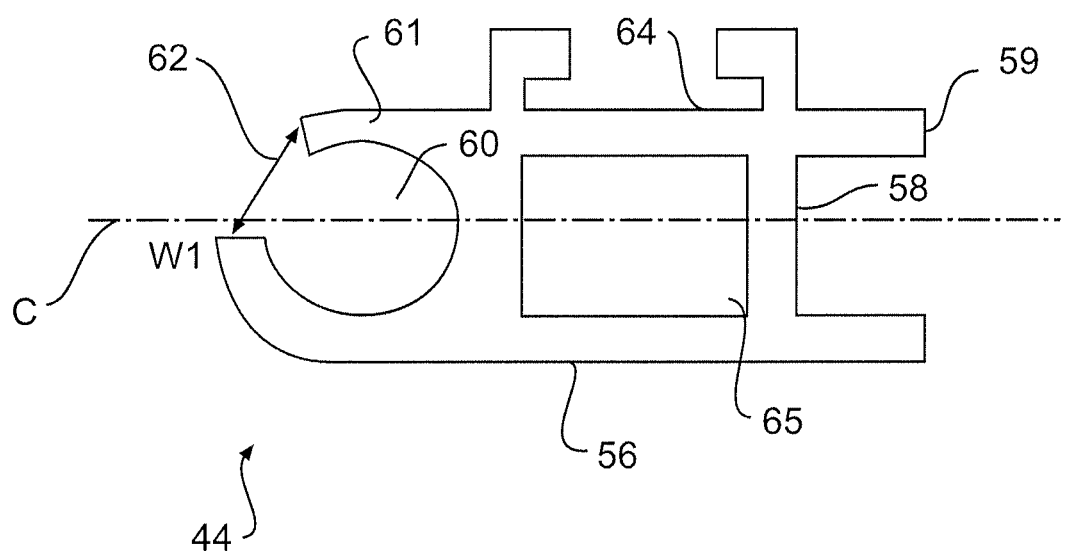
FIG. 5 is a cross-sectional view of a frame side piece according to an embodiment of the present invention.
Figure 6:
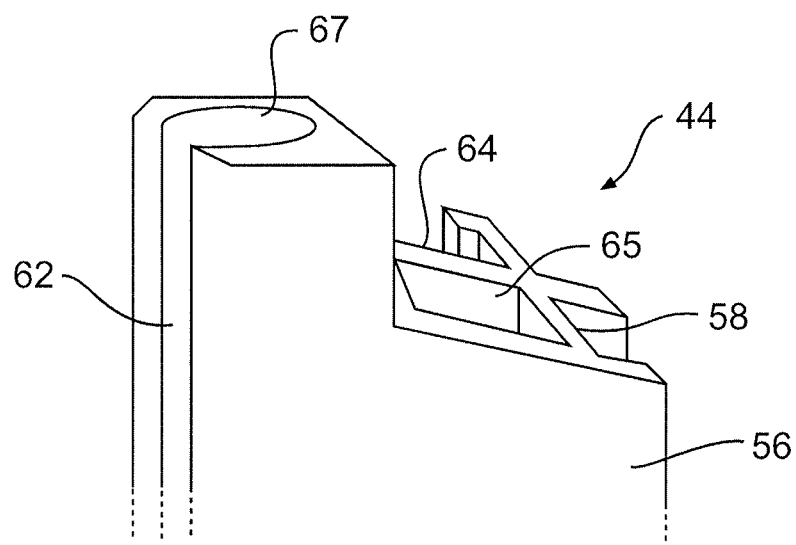
FIG. 6 is a perspective view of the frame side piece of FIG. 5.

Frame side piece 44 comprises an elongated member having a length L1. Frame side piece 44 may have a substantially consistent cross-sectional shape along most of its length. FIG. 5 is a cross-sectional view of frame side piece 44 taken along line AA in FIG. 4a. Frame side piece 44 includes an outwardly-facing surface 56 that can be a substantially flat surface. Frame side piece 44 includes an insert-receiving channel 58 running along a first side 59 and a partially-enclosed rod-receiving passage 60 on a second side 61 disposed opposite of the first side. A longitudinal rod-receiving passage 60 runs the length of second side 61 and has a longitudinal opening 62 therein. A top end of frame side piece 44 includes a top opening 67 that opens into the rod-receiving passage 60. The inwardly facing surface 56a of frame side piece 44 can also include a longitudinally-extending bracket channel 64 configured to receive and retain an L-shaped connector bracket 55. Bracket channels (not shown) can also be included on the inwardly-facing surfaces of frame bottom piece 40 and frame top piece 42. In some embodiments, frame side 44 may be hollow defining a central passage 65 extending longtitudinally therethrough, as shown. Such a configuration can be used to reduce the weight and material cost of the item. Insert-receiving channel 58 is sized and configured to receive a side of the insert. Insert 46 can be secured into the insert-receiving channel 58 by one or more suitable means such as screws, fasteners, friction-fitting or the use of an adhesive, etc. In certain embodiments, securing the frame portions to one another about or enclosing insert 46 in insert-receiving channels 58 can be sufficient to secure the insert 46 in place within frame 38.

Figure 7:
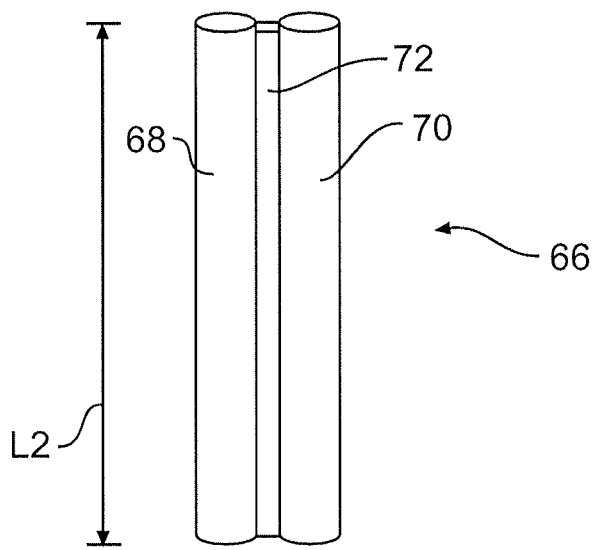
FIG. 7 is a perspective front view of a connecting rod according to an embodiment of the present invention.
Figure 8:
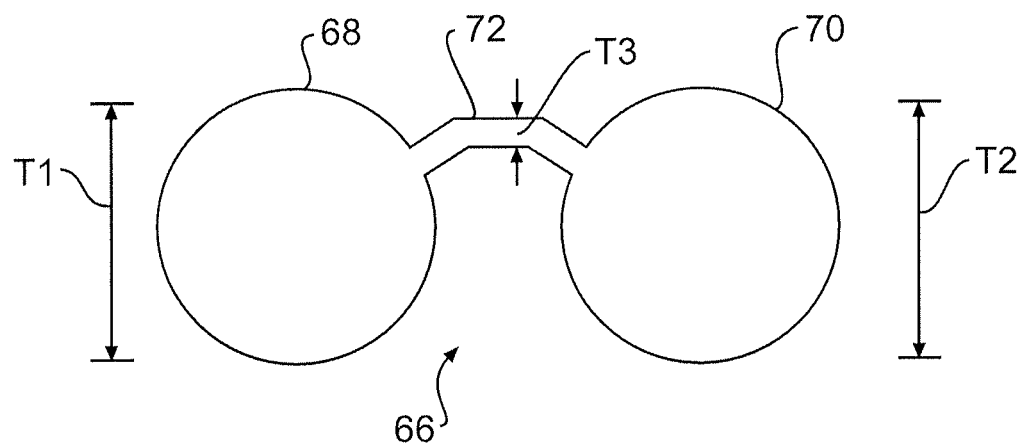
FIG. 8 is a cross-sectional view of the connecting rod of FIG. 7.

Adjacent panels 14 may be secured to one another via a plurality of connecting rods 66. An exemplary embodiment of a connecting rod 66 is shown in FIGS. 7 and 8. FIGS. 9a-9e show a variety of connecting rods 66 connecting together frame side pieces 44 of two adjacent panels 14. Connecting rod 66 may be formed from relatively-rigid materials. However, in a preferred embodiment, a relatively pliable or flexible material is used. Suitable materials such as certain plastics can be used. The use of relatively flexible materials for connecting rods 66 reduces the need for the remaining components to be manufactured with precise tolerances and also increases the ease of assembly. Connecting rod 66 has a length L2 which is preferably approximately equal to the length L1 of frame side piece 44. Preferably, connecting rod 66 may have a generally consistent cross-sectional shape along its length. In certain embodiments, connecting rod 66 is formed via an extrusion process and can be, for example, an extruded plastic. In general, connecting rod 66 includes a first enlarged portion 68, a second enlarged portion 70, bridge portion 72 that is smaller in cross section than the largest cross sectional dimensions of first enlarged portion 68 and second enlarged portion 70, such bridge portion being disposed between and connecting first and second enlarged portions 68, 70. In certain embodiments, bridge portion 72 may be substantially straight. In other embodiments, bridge portion 72 may be curved or angled. The first and second enlarged portions are sized and configured to fit within the rod-receiving passages 60 of adjacent panels 14. The first enlarged portion 68 has an effective thickness T1 that may be, for example, the thickness of first enlarged portion 68 at its thickest point. The second enlarged portion 70 has an effective thickness T2 that may be, for example, the thickness of second enlarged portion 70 at its thickest point. The bridge portion 72 has an effective thickness T3 that may be, for example, the thickness of bridge portion 72 at its thickest point. Thicknesses T1 and T2 are each greater than thickness T3. Connecting rod 66 can be symmetric such that thicknesses T1 and T2 are the same or substantially the same, if desired for interchangeability of connecting rods 66. Alternatively, connecting rod 66 can be asymmetric with thickness T1 being larger than T2 or vice versa. The first and second enlarged portions 68, 70 are sized such that thicknesses T1 and T2 are larger than the width W1 of longitudinal opening 62, enabling the first and second enlarged portions 68, 70 to be securely retained within the rod-receiving passages 60 of adjacent panels 14. The bridge portion 72 is sized such that the thickness T3 is smaller than the width W1, thereby permitting bridge portion 72 to pass through the longitudinal openings 62 of adjacent panels 14.

In certain embodiments, the longitudinal opening 62 is positioned at an angle relative to the line formed by centerline C. The angle may be determined by the geometry of the fully assembled table 10. For regular polygons, the offset angle will approximately equal 180/number of sides of the table). For example, in the illustrated embodiment where the table 10 is a regular hexagon, the longitudinal opening 62 is offset from the centerline C by approximately 30 degrees. In other embodiments, the longitudinal opening 62 can be aligned with the centerline C. In such embodiments, the bridge portion 72 can be formed in a curved or bent configuration to facilitate mating of adjacent panels 14 in the desired configuration. The angle of the curve or bend can be determined by the geometry of the fully assembled table 10. Offsets and rod-connecting bridges can be the same for the entire table or different for mating adjoining sides, thereby creating the ability to have an almost endless variety of irregular cross sectional table shapes.

The first and second enlarged portions 68, 70 as illustrated in FIG. 8 have a generally circular or rounded shape, but other suitable shapes can be used. The first and second enlarged portions 68, 70 can have, for example, a circular, square, rectangular, oval, diamond, triangular, or other cross-sectional shape. Preferably, the rod-receiving passage 60 is formed such that it has a cross-sectional size and shape that is substantially the same as, but slightly larger than, the cross-sectional size and shape of the first or second enlarged portion 68, 70. This configuration ensures a relatively secure fit between the connecting rod 66 and the frame 38. In some embodiments, the use of circular or rounded enlarged portions can present certain advantages by allowing a certain degree of rotation or movement of the enlarged portions 68, 70 within the rod-receiving passages 60. This rotation or movement can occur because the comparatively-thin bridge portion 72 is relatively pliable. Accordingly, the bridge portion 72 will generally be the point in the connecting rod 66 where deformation will occur as a result of an applied load. Such a load may occur as a result of minor dimensional imperfections in the manufacture of one or more components. Thus, this configuration can facilitate "play" in the joint, thereby easing assembly and increasing manufacturing tolerances.

In other embodiments, connecting rod 66 can also include an outwardly-facing decorative portion 74 extending from bridge portion 72. Examples of connecting rods 66 having a variety of different decorative portions 74 are shown in FIGS. 9a-9e. In certain embodiments, the decorative portion 74 can be sized and shaped to conceal or mask the joint formed by the connection of two adjacent panels 14. The outwardly-facing surface of the decorative portion can be painted or colored. For example, it may be desirable to paint or color the outwardly-facing surface to match the color of the frame and provide a more seamless appearance to the table. In certain embodiments, the decorative portion 74 can be formed from a material that is different from the material used to construct the remaining portions of the connecting rod 66. For example, the decorative portion 74 can be fabricated from the same material used to fabricate the frame 38. In such embodiments, the decorative portion 74 and the remaining portions of the connecting rod 66 can be fastened together via an adhesive or any other suitable means.

An exemplary top 16 is shown in FIG. 10. Top 16 can have any suitable geometry. In a preferred embodiment, the shape and size of top 16 will correspond to the shape and size of base 12. In a preferred embodiment, top 16 includes a top frame 76 and a top insert 84. Top frame 76 is preferably formed from a relatively rigid material such as aluminum, brass, copper, other sheet metal, or rigid plastic, but other suitable materials can also be used. The upper portions of panels 14 are configured to receive and support top frame 76. Screws, bolts, or other suitable fastening means can be used to secure top frame 76 to the panels 14, or the top frame can simply rest on them. In the illustrated embodiment, each side of the top frame 76 includes a pre-drilled hole 80 configured to align with the hole 54 formed in the tab 50 of a corresponding panel 16. Top frame 76 can include an inset ledge 78 configured to receive and support top insert 84. In a preferred embodiment, top insert 84 is transparent, partly transparent, translucent, or partly translucent, and can be formed from glass, plastics, or other suitable materials. In other embodiments, top insert 84 can be substantially opaque.

One suitable method of assembling the table 10 will now be described. First, the base 12 can be assembled if necessary. The panels 14 are then affixed to the support portion of the base 12. If all sides 20 of the base 12 have the same length, the panels 14 may be interchangeable. Alternatively, the panels 14 can be differently sized and configured to mate to only one or a limited number of sides 20 of the support portion. The holes 53 in lower tabs 52 are aligned with the pre-drilled holes 26 in the sides 20 of base 12. Appropriately dimensioned bolts are passed through the holes 53 and then into the pre-drilled threaded holes 26 and tightened to secure panels 14 to base 12. Connecting rods 66 are then fully inserted into the rod-receiving passages 60 to secure adjacent panels 14 to one another. The enlarged portions 68, 70 of each connecting rod 66 can be slid downwards and into the rod-receiving passages 60 via top openings 67. Next top frame 76 is placed on the tops of the panels 14. The holes 54 in upper tabs 50 of panels 14 are aligned with the pre-drilled holes 80 in the top frame 76. Appropriately dimensioned bolts are passed through holes and into pre-drilled holes and tightened to secure top frame 76 to table 10. Finally, top insert 84 is placed onto the top frame 76.

The use of the systems and methods described herein may possess several advantages. Knock-down or ready-to-assemble furniture, especially in welded aluminum, typically requires greater component tolerances than are required with, for example, flat panel wood cabinets. The panel connection system described herein may facilitate assembly despite dimensional variances in the parts assembly, and may permit greater tolerances in component fabrication. The panel connection system may also make such dimensional variances less visible by creating seamless or relatively-seamless joints. Seamless joints may be desirable to prevent light from passing through the gaps between the panels and thereby accentuating any variations in gap thickness.

The invention may be embodied in other specific forms without departing from the spirit or essential characteristics thereof. For example, while the embodiment disclosed herein is a lighted table, in other embodiments, the systems and methods described herein may be used in connection with other pieces of furniture, such as chairs, beds, sofas, dressers, desks, and others. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A lighted furniture apparatus comprising:
   a base, a side panel assembly, a top, and a lighting element;
   the side panel assembly comprising a first and second side panel, at least a portion of each of said side panels being at least partially light-transmitting, the first side panel having a first vertical edge and the second side panel having a second vertical edge, each of the first and second vertical edges defining a partially-enclosed rod-receiving passage running longitudinally along and within the vertical edge and a longitudinal opening that runs along the vertical edge and opens into the rod-receiving passage;
   the side panel assembly further comprising at least one elongated connecting rod having a substantially consistent cross-sectional shape and comprising a first enlarged cross-sectional portion with a first thickness, a second enlarged cross-sectional portion with a second thickness, and a cross-sectional bridge portion disposed between and connecting said first and second enlarged portions, the bridge portion having a third thickness that is less than the first and second thicknesses;
   wherein said at least one connecting rod is configured to connect the first and second side panels when the panels are positioned with the first panel adjacent to the second panel so that the first and second vertical edges are adjacent with the longitudinal openings of the rod-receiving passages facing, said first enlarged portion of said connecting rod being sized and shaped to be slidably received within, and at least partially retained by, the rod-receiving passage of the first vertical edge and the second enlarged portion of said connecting rod being sized and shaped to be slidably received within, and at least partially retained by, the rod-receiving passage of the second vertical edge, the longitudinal openings of the first vertical edge and the second vertical edge being sized and shaped to permit the bridge portion to pass therethrough longitudinally, thereby defining an interior space with sides at least partially enclosed by the side panel assembly;
   wherein an upper portion of the side panel assembly is operably configured to receive the top, and said base is operably configured to receive a bottom portion of the side panel assembly; and
   wherein the lighting element is disposed within said interior space.

2. The lighted furniture apparatus of claim 1, wherein the first and second side panels comprise a frame and an insert pane, the frame at least partially retaining the insert pane, wherein the insert pane is at least partially light transmitting, wherein the frame of the first side panel comprises a first frame side piece and the frame of the second side panel comprises a second frame side piece, the first frame side piece comprising the first vertical edge and the second frame side piece comprising the second vertical edge.

3. The lighted furniture apparatus of claim 2, wherein each of the first and second frame side pieces further define an insert pane-receiving channel running longitudinally along the side pieces on a side of the side pieces substantially opposing the rod-receiving passage, the insert-pane receiving channel being configured to receive a side edge of the insert pane.

4. The lighting furniture apparatus of claim 2, where said base and the frames of said first and second side panels are metal and wherein the insert panes are glass.

5. The lighted furniture apparatus of claim 1, wherein the first vertical edge defines a first end access at an end of the first vertical edge, and the second vertical edge defines a second end access at an end of the second vertical edge, the first and second end accesses communicating into the respective rod-receiving passage, the first and second end accesses being configured to slidably receive, respectively, the first and second enlarged portions of the at least one connecting rod.

6. The lighted furniture apparatus of claim 1, wherein said base and said top each define a hexagonally-shaped perimeter in cross section taken in a plane parallel to a surface on which the base is configured to rest.

7. The lighted furniture apparatus of claim 1, wherein said at least one connecting rod is made from a flexible extruded plastic.

8. The lighted furniture apparatus of claim 1, wherein said at least one connecting rod further comprises a decorative cross-sectional portion extending outwardly from said bridge portion beyond the first and second vertical edges along a desired longitudinal length, and having a flange presenting an outwardly facing surface, said decorative portion configured to at least partially conceal a joint formed by the connection of said adjacent first and second panels.

9. The lighted furniture apparatus of claim 1, wherein each of said rod-receiving passages has a generally circular shaped cross section.

10. The lighted furniture apparatus of claim 1, wherein each of said first and second enlarged portions has a generally circular shaped cross section.

11. The lighted furniture apparatus of claim 1, wherein said lighting element is secured to a portion of the base system.

12. The lighted furniture apparatus of claim 1, wherein said lighting element is battery-powered.

13. The lighting furniture apparatus of claim 12, further comprising a slidable tray secured to said base system and a battery assembly configured to power said lighting element, said slidable tray including a recess, said battery assembly being disposed in said recess, said slidable tray being configured to be slid out from underneath said base system to permit easy access to said battery assembly.

14. The lighting furniture apparatus of claim 1, wherein said top comprises a top frame and a top insert pane, said top insert pane being at least partially light-transmitting.

15. The lighting furniture apparatus of claim 1, wherein said first side panel further comprises a first lower tab defining a first hole and said second side panel further comprises a second lower tab defining a second hole, and said base defining a third and fourth hole, with the third hole corresponding and proximate to the first hole and the fourth hole corresponding and proximate to the second hole, such that the corresponding holes may be aligned in overlapping fashion during assembly such that the first and third hole are adapted to receive a first fastener and the second and fourth hole are adapted to receive a second fastener thereby securing the first and second side panels of the side panel assembly to the base.

16. A kit for a lighted furniture apparatus, the kit comprising:
a base system, a side panel assembly, a top system, and a lighting element;
the side panel assembly comprising at least a first and second side panel, each of said side panels comprising a frame and an insert pane that is at least partially retained by said frame, the insert pane being at least partially light-transmitting, said frame of said first side panel having a first frame side piece and said frame of said second side panel having a second frame side piece, each of said first and second frame side pieces defining a partially-enclosed rod-receiving passage running longitudinally along and within the side pieces, said first and second frame side pieces each defining an opening running longitudinally so as to open into said rod-receiving passages, said first and second frame side pieces each defining an opening at at least one end that opens into said rod-receiving passages;
the side panel assembly further comprising at least one elongated connecting rod having a substantially consistent cross-sectional shape along its length and comprising a first enlarged cross-sectional portion, a second enlarged cross-sectional portion, and a cross-sectional bridge portion disposed between and connecting said first and second enlarged portions, a maximum thickness of said bridge portion being smaller than both a maximum thickness of said first enlarged portion and a maximum thickness of said second enlarged portion;
wherein said at least one connecting rod is configured to connect the first and second side panels when the panels are positioned with the first panel adjacent to the second panel so that the first and second side pieces are adjacent with the longitudinal openings of the rod-receiving passages facing, said first enlarged portion of said connecting rod being sized and shaped to be slidably received within, and retained by, the rod-receiving passage of the first frame side piece via the end opening of the first frame side piece and the second enlarged portion of said connecting rod being sized and shaped to be slidably received within, and retained by, the rod-receiving passage of the second frame side piece via the end opening of the second frame side piece, the longitudinal openings of the first frame side piece and the second frame side piece being sized and shaped to permit the bridge portion to pass therethrough longitudinally, the first and second side panels thereby defining an interior space with sides at least partially enclosed by the side panel assembly;
wherein the top system is operably configured to be secured to a top of the side panel assembly, and said bottom system is operably configured to be secured to a bottom of the side panel assembly, the top and bottom systems configured to thereby at least partially enclose the interior space from the top and the bottom; and
wherein the lighting element is mounted to an interior surface of the apparatus and disposed within said interior space.

17. The kit of claim 16, wherein said at least one connecting rod comprises a plurality of connecting rods and wherein said at least first and second side panels comprise a plurality of side panels, each of said plurality of connecting rods being configured to connect an adjacent two of said plurality of side panels.

18. The kit of claim 17, wherein said plurality of connecting rods are formed from an extruded plastic.

19. The kit of claim 16, wherein said at least one connecting rod further comprises a decorative cross-sectional portion extending outwardly from said bridge portion beyond the first and second side pieces along a desired longitudinal length, and having a flange presenting an outwardly facing surface, said decorative portion configured to at least partially conceal a joint formed by the connection of said adjacent first and second panels.

20. The kit of 16, wherein said first and second enlarged portion have a generally circular cross section.

21. The kit of claim 15, where the frames of said first and second side panel are metal and wherein the insert pane is glass.

* * * * *

UNITED STATES PATENT AND TRADEMARK OFFICE
CERTIFICATE OF CORRECTION

| | | |
|---|---|---|
| PATENT NO. | : 8,684,552 B2 | Page 1 of 1 |
| APPLICATION NO. | : 13/546360 | |
| DATED | : April 1, 2014 | |
| INVENTOR(S) | : Martin de Blois | |

It is certified that error appears in the above-identified patent and that said Letters Patent is hereby corrected as shown below:

In the Specification

Column 3, line 10, "[?]" should be removed.

In the Claims

Column 10, line 61, claim 21, change "15" to --16--.

Signed and Sealed this
Sixteenth Day of September, 2014

Michelle K. Lee
*Deputy Director of the United States Patent and Trademark Office*